July 19, 1966  M. M. FAWZY  3,261,996
HYSTERESIS MOTOR
Filed July 29, 1963
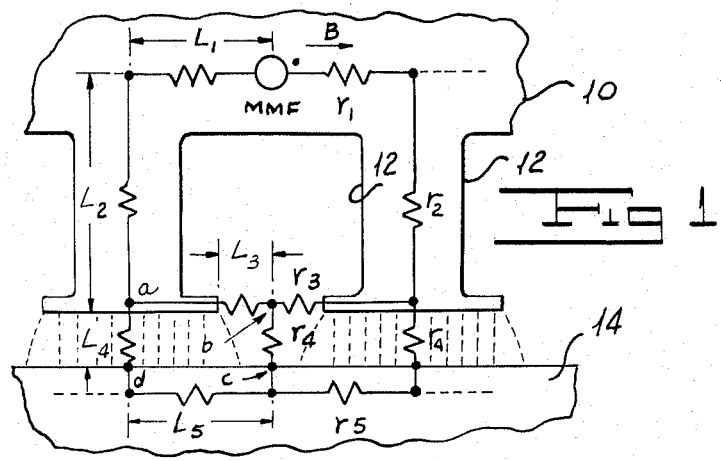
Fig 1
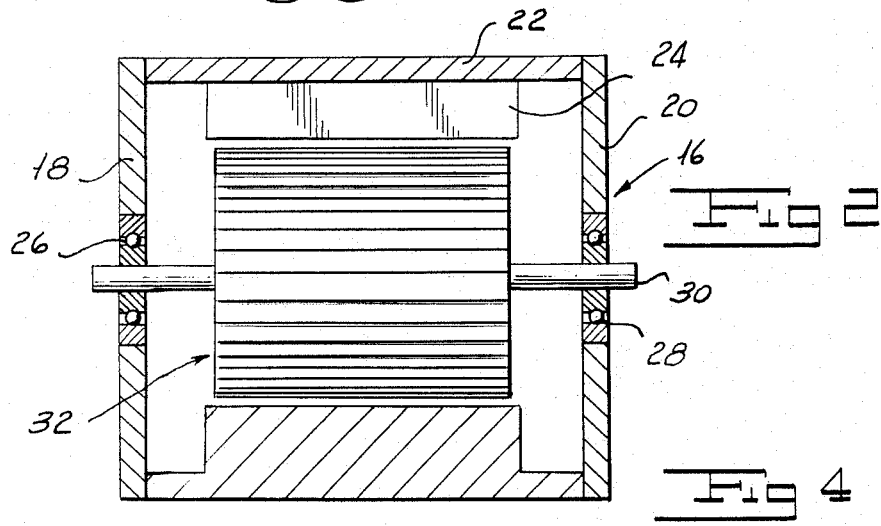
Fig 2
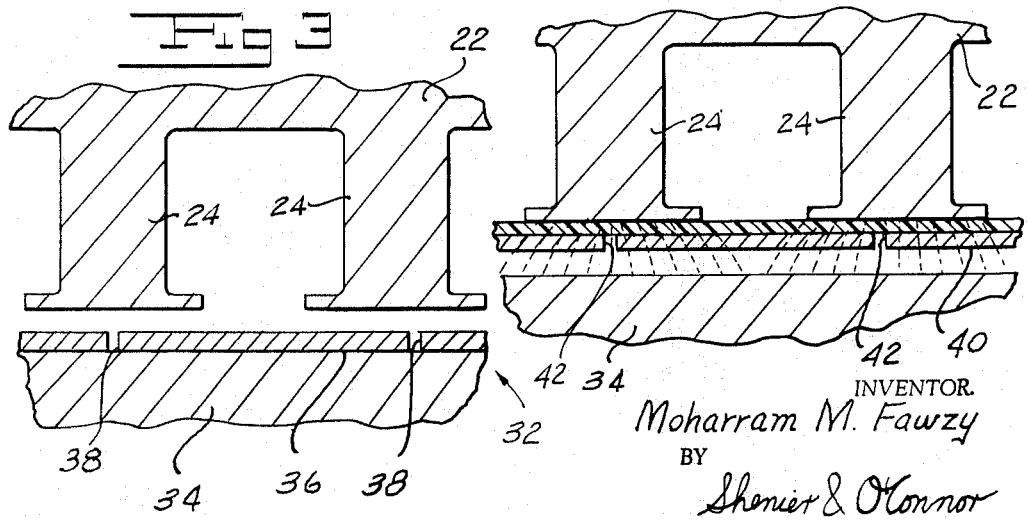
Fig 3
Fig 4
INVENTOR.
Moharram M. Fawzy
BY
Shenier & O'Connor
ATTORNEYS

United States Patent Office 3,261,996
Patented July 19, 1966

3,261,996
HYSTERESIS MOTOR
Moharram M. Fawzy, Monroe, Conn., assignor to United Aircraft Corporation, East Hartford, Conn., a corporation of Delaware
Filed July 29, 1963, Ser. No. 298,245
2 Claims. (Cl. 310—86)

My invention relates to a hysteresis motor and more particularly to an improved hysteresis motor which is more efficient and which is smoother in operation than are motors of this type known in the prior art.

There are known in the prior art induction motors in which the secondary core is constructed of hardened magnet steel rather than of the usual annealed low loss silicon steel laminations. In this type of motor the secondary hysteresis loss is greatly magnified producing effective synchronous motor action. These motors which are used, for example, to drive clocks and phonographs are known as hysteresis motors.

Owing to the fact that hysteresis motors have stators or primaries which are provided with discrete teeth, they inherently have a variation in flux density around the air gap. This variation in flux density produces two undesirable effects. First, spurious minor hysteresis loops are produced which result in undesirable noise torques and excessive heating. The motors have a relatively high leakage inductance and a poor power factor. They have a low torque for the size of the motor, high power loss and consequently poor efficiency. Not only is this true but "tooth locking" effect causes erratic motion of the rotor particularly at low speeds.

I have invented an improved hysteresis motor which overcomes the defects of hysteresis motors of the prior art. My motor has a relatively uniformly distributed air gap flux. My motor reduces the tooth locking effect present in motors of the prior art. It is more efficient than are hysteresis motors of the prior art. My hysteresis motor does not have the excessive heating present in motors of the prior art. I minimize the effect of the stator slots without excessively affecting the magnetization current of the motor.

One object of my invention is to provide an improved hysteresis motor which overcomes the defects of hysteresis motors of the prior art.

Another object of my invention is to provide an improved hysteresis motor with an increased synchronous torque output.

Another object of my invention is to provide an improved hysteresis motor in which the effect of tooth locking is minimized.

A further object of my invention is to provide an improved hysteresis motor in which the air gap flux distribution is relatively uniform.

Still another object of my invention is to provide an improved hysteresis motor which is more efficient than are hysteresis motors of the prior art.

A still further object of my invention is to provide an improved hysteresis motor which does not heat excessively.

Other and further objects of my invention will appear from the following description.

In general my invention contemplates the provision of an improved hysteresis motor in which I place a sleeve of high-permeability material in the air gap between the stator carrying the primary winding and the rotor of hardened magnet steel with the sleeve spaced from the stator.

In the accompanying drawings which form part of the instant specification and which are to be read in conjunction therewith and in which like reference numerals are used to indicate like parts in the various views:

FIGURE 1 is a fragmentary view of the magnetic circut of a hysteresis motor with parts shown schematically illustrating the problem solved by my improved hysteresis motor.

FIGURE 2 is a sectional view of one form of the the magnetic circuit of my improved hysteresis motor.

FIGURE 3 is a fragmentary sectional view of the form of the magnetic circuit of my improved hysteresis motor shown in FIGURE 2.

FIGURE 4 is a fragmentary sectional view of an alternate form of the magnetic circuit for my improved hysteresis motor.

Referring now to FIGURE 1, the hysteresis motor illustrated therein comprises a stator 10 provided with a plurality of slots 12 for receiving the primary winding (not shown) of the motor. This motor includes a rotor 14 formed from hardened magnet steel. In FIGURE 1 I have illustrated schematically the various parts making up the flux path corresponding to one slot 12 of the stator 10. As is known in the art for any flux path:

(1) $\quad B = uH$ per unit length of path

Now (2) $\quad\quad\quad\quad \phi = BA$ where $A$ = area

Therefore (3) $\quad \phi = uHA$ per unit length of path or $$\phi = u \frac{M.M.F.}{L} \cdot A$$

where M.M.F. is total ampere turns for path.

From Equation 4 it is apparent that:

(5) $\quad\quad\quad\quad M.M.F. = \phi \frac{L}{Au}$ or (6) $\quad\quad\quad\quad M.M.F. = \phi R$ where R is path reluctance. Equation 6 may be written (7) $\quad\quad\quad\quad M.M.F. = Br$ where $r$ is $L/u$ Now for the path shown in FIGURE 1:

$r_1 = A_1$—outer core reluctance ½ tooth pitch
$r_2 = A_2$—outer core reluctance 1 tooth
$r_3 = A_3$—outer core reluctance ½ slot opening
$r_4 = A_4$—outer core reluctance air gap
$r_5, r'_5, \ldots = A_5$—inner core reluctance, ½ tooth pitch with variable permeability due to changing flux density
where $A_1, A_2 \ldots$ are path areas.

Typically, assume $u_s$ for stator or outer core to be 10000 unsaturated; assume the rotor or hysteresis ring $u_r = 50$; assume length $L_3$ to be .020 inch and $L_4$ to be .003 inch. Under these conditions:

$r_1 = L_1/u_s = L_1/10000 = L_1 \times 10^{-4}$
$r_2 = L_2/u_s = L_2/10000 = L_2 \times 10^{-4}$
$r_3 = L_3/u_a = 0.020/1 = 0.02$
$r_4 = L_4/u_a = 0.003/1 = 0.003$
$r_5 = L_5/u_r = L_5/50 = 0.02 L_5$ Thus $r_1$ and $r_2$ are negligible. Also reluctance of path $abc > ad$. Therefore flux entering rotor at $c$ is smaller than that at $d$. Ratio in order of $r_4/(r_3+r_4)$, when effect of all M.M.F. generators is considered. It is the variation in flux distribution evidenced by the preceding analysis which produces the undesirable results heretofore pointed out in hysteresis motors of the prior art.

Referring now to FIGURES 2 and 3, I have shown one form of my improved hysteresis motor indicated generally by the reference character 16 having end plates 18 and 20 supporting the stator 22 which has a plurality of slots forming poles 24 which carry the stator winding (not shown) in a manner known to the art. The respective end plates 18 and 20 carry bearings 26 and 28 which support the shaft 30 of the motor rotor indicated generally by the reference character 32.

Rotor 32 includes a ring 34 of the type known in the art formed of hardened magnet steel. I mount a sectionalized sleeve 36 of suitable high-permeability material on the rotor ring 34. This sleeve 36 serves to improve the distribution of flux around the machine and thus minimizes the deleterious effect of local variation of flux density due to the presence of slot openings around the machine air gap. I provide the sleeve 36 with a plurality of gaps 38 to prevent magnetic shorting of the flux away from the rotor. In such case, preferably in order to obviate the possibility of very minor or residual tooth locking effect which might result, I employ enough gaps 38 to form a number of segments which is unequal to the number of poles on the stator formed by the gaps 12. For example, I may provide a number of gaps 38 such that the number of segments is twice the number of stator teeth plus 2, 4, 6, et cetera. Owing to this arrangement, any minor tooth locking effect will be overcome.

Referring now to FIGURE 4, I have shown an alternate form of my improved hysteresis motor in which I mount a sleeve 40 on the stator 22. In this form of the invention, I position the sleeve 40 on a substrate 42 formed of a suitable material such, for example, as an epoxy resin to prevent the material of the sleeve 40 from shorting the stator flux. In this instance I also provide the sleeve 40 with a plurality of narrow gaps 44 to afford electrical isolation to prevent magnetic shorting of flux away from the rotor. Owing to the fact that in this form of the invention the sleeve is on the substrate, it is not essential that any particular number of gaps 44 be provided since they will exhibit no hysteresis effect. Preferably, however, I employ a large number of gaps or slots 44.

In the operation of both forms of my improved hysteresis motor, in response to energization of the stator winding (not shown) carried by the stator 22, a flux is produced in the air gap between the ends of the poles 24 and the rotor 34. Owing to the presence of the sleeve 36 (or 40) in the air gap the flux is evenly distributed around the air gap. This will be apparent by a comparison of the flux illustrated in FIGURE 1 and that shown in FIGURE 4. In response to this flux currents are introduced in the rotor 34. By virtue of the hysteresis losses introduced into the hardened steel secondary member 34 the rotor 32 starts to turn.

It will be seen that I have accomplished the objects of my invention. My improved hysteresis motor overcomes the defects of hysteresis motors of the prior art. The synchronous torque of the motor is increased. The effect of tooth locking is minimized in my motor. The air gap flux distribution is relatively uniform. My motor does not heat excessively and is more efficient than are hysteresis motors of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A hysteresis motor including in combination a stator having a plurality of poles, a rotor comprising hardened magnetic steel, means mounting said rotor and said stator for relative movement with an air gap therebetween, a sleeve having a wall of high permeability material provided with a plurality of axially-extending circumferentially-spaced slots extending through said sleeve wall to divide said sleeve into a plurality of discrete elements, and means comprising diamagnetic material mounting said sleeve on said stator.

2. A hysteresis motor including in combination a stator having a plurality of poles, a rotor comprising hardened magnetic steel, means mounting said rotor and said stator for relative movement with an air gap therebetween, a sleeve of high permeability material provided with a plurality of axially-extending circumferentially-spaced slots dividing said sleeve into a number of elements which differs from the number of stator poles, and means mounting said sleeve in said air gap in spaced relationship to said stator.

References Cited by the Examiner

UNITED STATES PATENTS

| | | | |
|---|---|---|---|
| 1,396,521 | 11/1921 | Myers | 310—86 X |
| 2,993,131 | 7/1961 | Trevitt | 310—214 |
| 3,068,371 | 12/1962 | Galtz | 310—86 X |
| 3,068,373 | 12/1962 | Bekey | 310—162 |

MILTON O. HIRSHFIELD, *Primary Examiner.*

D. F. DUGGAN, *Assistant Examiner.*